(12) United States Patent
Flamme et al.

(10) Patent No.: US 6,382,748 B1
(45) Date of Patent: May 7, 2002

(54) CABINET SYSTEM

(75) Inventors: Hans Flamme, Unterhaching; Peter Mueller, Grosshelfendorf; Josef Knab, Rossbach; Horst Reinhart, Munich, all of (DE)

(73) Assignee: Knuerr-Mechnik fuer die Elektronik Aktiengesellschaft, Munich (DE)

( * ) Notice: Subject to any disclaimer, the term of this patent is extended or adjusted under 35 U.S.C. 154(b) by 0 days.

(21) Appl. No.: 09/665,101

(22) Filed: Sep. 20, 2000

(30) Foreign Application Priority Data

Sep. 22, 1999 (DE) ..................... 299 16 705 U

(51) Int. Cl.[7] .............................................. A47B 47/00
(52) U.S. Cl. .................. 312/257.1; 312/265.2
(58) Field of Search .................... 312/223.1, 257.1, 312/265.1, 265.2, 265.4, 265.5, 245; 361/724, 725, 726

(56) References Cited

U.S. PATENT DOCUMENTS 3,307,894 A * 3/1967 Collier .................... 312/265.2
5,441,337 A * 8/1995 Mazura et al. ........ 312/257.1 X
6,142,591 A * 11/2000 Hemann .................. 312/223.1

FOREIGN PATENT DOCUMENTS

| DE | 198 11 777 | 7/1999 |
| EP | 0 143 718 | 6/1985 |
| FR | 1 573 477 | 7/1969 |

OTHER PUBLICATIONS

VERO Brochure, "IMRAK 40(15)—Wandgehäuse", 3 pages, Jan. 1999.

* cited by examiner

Primary Examiner—James O. Hansen
(74) Attorney, Agent, or Firm—Jacobson Holman, PLLC

(57) ABSTRACT

A cabinet system, especially for a wall cabinet, with a frame, which has a rear wall, built-in brackets and vertical profiles, and with lining parts, which, following mounting and cabling of electrical appliances and components, are fastened to the frame. The cabinet, which can be installed by one person, is easy to fit, and customer-friendly and permits good accessibility and cabling, also ensures high security against any unauthorized openings. The built-in brackets are directly inserted or locked on the rear wall and then secured thereto.

16 Claims, 2 Drawing Sheets

CABINET SYSTEM

FIELD OF THE INVENTION

The invention relates to a cabinet system utilized especially for a wall cabinet, having a frame, which is provided with a rear wall member, built-in brackets and vertical profiles, and with lining parts which, following installation and cabling of electrical appliances and components, can be fixed to the frame.

The cabinet system is intended for use in network technology and cable distribution and must meet a variety of demands, especially with respect to ease of fit and service, accessibility and cable management. Accessibility relates to the installation and servicing of components to be installed and a cable run, which allows complete wiring to take place without threading.

BACKGROUND OF THE INVENTION

DE 198 11 777 C1 discloses a small cabinet for wall attachment, which comprises a rear wall, top and bottom parts and a cover with a front panel and two side parts. The side parts are received in longitudinal side receptacles of the rear wall and at least one side comprises two portions interconnected by means of a hinge, so that it is possible to laterally swing up an area of the cover. The three-sided cover is fixed with fastening screws to the longitudinal webs of the rear wall side base plate. Supporting and stiffening takes place by means of sealing edges, which are provided on the top and bottom parts.

Prior art wall cabinets are relatively complicated to manufacture due to needed fastening elements in the base plate and cover and due to the hinge in the lateral part of the cover.

A cabinet system for wall cabinets is known from VERO catalogue issue 01/99 where "apw enclosure products IMRAK und Netzwerklösungen" are discussed. The prior art wall cabinet provided with lining parts has a frame with a rear wall, two upper and lower built-in brackets and two front vertical profiles, which surround a reception space for electrical appliances, subassemblies and components. The lining parts which include a top part, a bottom part, two side walls and a door, are removable. In each case, the upper and lower built-in brackets are interconnected by means of a vertically oriented connecting strut and are fixed to the rear wall in the vicinity of the connecting strut using fastening screws. This fastening requires a relatively high dimensional stability of the C-shaped built-in bracket structure and can have an adverse effect on the installation of the wall bracket and on accessibility during the installation of appliances and cabling.

SUMMARY OF THE INVENTION

An object of the present invention is to provide a cabinet system, which can be installed by one person, that is easy to fit and customer-friendly, and permits easy accessibility for installation and cabling purposes, while at the same time ensuring high security against any unauthorized opening.

According to the invention, this object is achieved with a cabinet, that has a frame with a rear wall member, built-in brackets, vertical profiles and lining parts which, following installation and cabling of electrical appliances and components, can be fixed to the frame, in that the built-in brackets are constructed for direct fastening to the rear wall. The built-in brackets are initially held, inserted or locked to the rear wall, particularly in the area of reinforcing creases, and are subsequently secured, for example, by using fastening elements.

One fundamental idea of the invention comprises the built-in brackets, can be individually and directly fastened to the rear wall, and which form with the rear wall at least two front vertical profiles, a frame.

According to the invention, the rear wall and built-in brackets are constructed in such a way that each built-in bracket is initially inserted in a complimentary reception opening formed in the rear wall and can be subsequently secured with the aid of a fastening means, particularly a fastening screw. The insertable fastening or push-fitting of the built-in brackets, which can be screw-assembled, can be carried out by one person and is therefore easy to fit and is customer friendly.

Production advantages result from an identical construction of the built-in brackets, which are preferably constructed as U-profiles or sections, that have on a rear fastening area at least one fastening element for insertion in at least one reception opening of the rear wall. The fastening element can, for example, be constructed as a hook or nose, permits insertion or engagement with clamping in place or locking. This ensures a retention of each built-in bracket up to the time of screwing down.

The identical built-in brackets are fastened in such a way that the openings of the U-shaped built-in brackets face one another. The vertical legs of the U-shaped built-in brackets are provided with rows of holes, which serve to receive one fastening means for securing the vertical profiles and/or the lining parts of the wall cabinet.

Advantageously in the rear fastening area, the built-in brackets are provided with more stable, e.g., higher, vertical legs, whereas the front reception area is constructed for receiving the top or bottom part and has a reduced height. This leads to a step-like construction of the built-in brackets, that permits a stable, secure fastening to the rear wall and simultaneously a simple, rapid fastening of the vertical profiles and in particular the top and bottom parts.

Apart from the easy fitting customer-friendly construction, a further advantage of the cabinet system is that the vertical profiles are constructed for 19", metric and ETSI units and can be fixed to the U-shaped built-in brackets. In the case of a 19" profile, mounting can take place on the insides of the inner legs of the built-in brackets, whereas a metric vertical profile can be fastened to the inside of the outer leg of the U-shaped built-in brackets. It is fundamentally possible to fasten a further vertical profile to the upper and lower built-in brackets close to the rear wall. It is then possible to fasten draw-out rails, additional depth profiles and components to the front and rear vertical profile.

The rear wall member provided for the insertion of at least four built-in brackets, constructed as a base plate and provided with vertically directed reinforcing creases. The reinforcing creases are formed close to the vertical edge areas and are directed towards the reception space and have, particularly in an upper and a lower area, in each case at least one reception opening for the insertable built-in brackets and a bore for screwing down said brackets.

As a result of the reinforcing creases, which are cross sectionally approximately trapezoidal, not only is the advantageous insertion of the built-in brackets ensured, but there is also high stability of the base plate.

The rear wall is appropriately fastened by screw fastenings and at least four embossings are provided for receiving the screw heads. It is advantageous for the outwardly directed embossings to be aligned and roughly on the same level as the vertical edge areas, so that a stable rear wall mounting exists.

According to the invention and to ensure extremely good accessibility for the mounting of appliances, and passive and active components with full accessibility of the connecting parts, the four built-in brackets are projected at right angles in the forward direction, and rear wall and vertical profiles form the frame of the cabinet system. Cabling is possible without threading and is extremely customer-friendly.

The lining parts can be fitted after the mounting of the appliances and components, and following cabling. It is particularly advantageous that all the lining parts can be very rapidly fitted and fastened by one person and if necessary can be removed at any time.

The lining parts and rear wall of the frame are constructed in such a way, that a tight engagement and retention of the lining parts are ensured. Horizontally and vertically directed webs are formed as virtually right-angled bends directed towards the reception space on the rear wall. The upper and lower horizontal webs of the rear wall simultaneously serve as retention and engagement for the top and bottom parts. The top part and substantially identically constructed bottom part have for this purpose on the rear edge area at least two fastening elements for slipping or sliding onto a specific wall web. The side walls can be fixed in the same way to the rear wall.

The rear edge of the top and bottom parts is also provided with at least one recess for cable strands, which can also run along the wall. It is appropriate to construct the recess in the top and/or bottom parts as a brush recess.

In the front and lateral edge area, the top and bottom parts have multiple bends. The edge areas are constructed as horizontal, inwardly directed, U-shaped profiles. A front edge area is dimensioned in complimentary manner to the front reception area of the built-in brackets and in this way permits a retention action and sliding of the top and bottom parts onto the built-in bracket. The top or bottom parts slide on or are clamped on a rear wall web and a front reception area of the built-in bracket, which can subsequently be secured on the latter by means of fastening screws. This securing action can take place from the inside or the reception space.

It is possible to fasten the side walls following the fitting of the top and bottom parts. Appropriately, the side walls are provided in an upper and lower edge area with a right-angled bend and in a front, vertical edge area with a U-shaped bend. In the area of the rear edges, the side walls engage on the vertical edge areas of the rear wall and with the upper and lower, horizontal edge area on the U-shaped edge area of the top part. A screw-assembly of the side walls can also take place from the reception area.

A front door can also be constructed as a viewing or steel door. In a preferred embodiment, the door is articulated by means of two bolts or pins, which in the fitted state project upwards and downwards and engage in complimentary openings of the top and bottom parts. In a preferred embodiment, the pins are mounted so they can be displaced and secured in oblong holes, which are accessible from the inside of the door. Therefore, it is possible to insert the door with a lower pin e.g., held in the central position in the lower opening as the lower hinge hole and to slide the upper hinge pin, after the arrangement of the door in the installation position, into the upper opening or upper hinge hole and secure same position.

It is advantageous to provide the door, at least on both longitudinal sides, with approximately U-shaped profiles as edge areas. It is possible to place in said U-shaped edge areas the hinge pins on one side and lock on the other side.

The cabinet system, according to the invention, is characterized by low manufacturing cost and extremely-cost effective installation. A wall cabinet can be dispatched in a flat pack and rapidly installed by one person as a result of the function of the individual elements. Apart from the easy accessibility permits complete wiring without any threading of cables. The frame which is stable and variable makes it possible to receive or house different appliances and subassemblies and simultaneously ensure customer-friendly quality service. The lining parts are secured from the inside reveal no fastening from the outside. Thus, the components are protected against any unauthorized openings. Therefore, only after opening the preferably lockable door is it possible to gain access to the fastening means and the lining parts, which can be successively removed.

BRIEF DESCRIPTION OF THE DRAWINGS

The invention is described in greater detail hereinafter relative to the drawings.

DETAILED DESCRIPTION RELATIVE TO THE DRAWINGS

Figure 1:
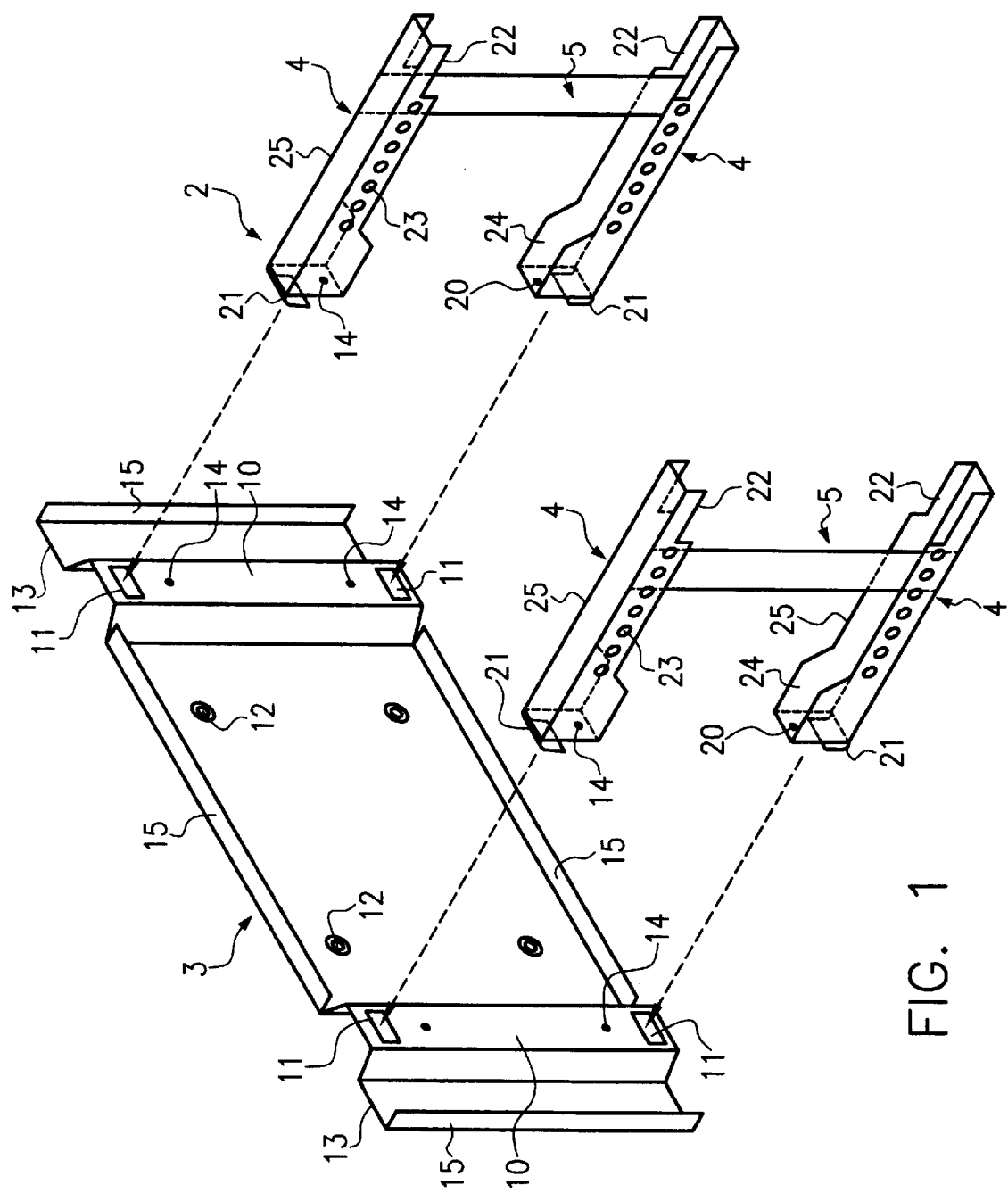
FIG. 1 shows in exploded view a frame of the cabinet system according to the present invention.

The frame 2 of the cabinet system according to the invention shown in FIG. 1 has a rear wall 3 with reinforcing creases 10 close to vertical edge areas 13, four built-in brackets 4 and two vertical profiles 5.

The four built-in brackets 4 are fastened in the form of two upper and two lower depth struts to the rear wall member 3 in the area of the reinforcing creases 10 by being inserted with fastening elements 21 on a rear fastening area 24 in reception openings 11 located in the area of the vertically directed reinforcing creases 10 and are subsequently screwed down with in each case a single, fastening element (not shown)e.g., a screw in fastening openings 14 e.g., a bore. The rear wall member 3, built-in brackets 4 and vertical profiles 5, like lining parts 6 to 9 according to FIG. 2, can be produced by punching and bending processes.

The built-in brackets 4 are constructed as U-shaped profiles with inner and outer legs and fastening bores, particularly rows of holes 23 in the vertical legs and permit a fastening of the vertical profiles 5, which are also provided with corresponding fastening openings, also for components (not shown) to be fitted, on the inside of the inner or outer leg for 19", metric or ETSI built-in units.

In this embodiment, the rear wall member 3 is constructed as a roughly rectangular base plate with the vertical edge areas 13 and terminal webs 15, which run horizontally and vertically. The vertical edge areas 13 are in virtually the same plane as embossings 12 for the wall fastening of the rear wall member 3 and consequently the complete cabinet. The embossings 12 are directed towards the wall, so that screw heads of the fastening means are received.

The insertion of the individual built-in brackets 4 in the reception openings 11 in the area of the reinforcing creases 10 is indicated by broken lines. Following insertion, screw assembly takes place with fastening elements (not shown), which are guided through a corresponding opening 20 in a rear end of the built-in brackets 4 and in the fastening opening 14 below or above the reception openings 11.

The built-in brackets 4 have a rear fastening area 24 and a front reception area 22 with higher or lower U-legs compared with the central area 25, in which the rows of holes 23 are formed. The higher, rear fastening area 24 serves for stable, secure engagement on the rear wall member 3 in the area of the reinforcing creases 1 0. The front reception area 22 receives a top part 7 or a bottom part 6 of the lining parts 6 to 9.

Figure 2:
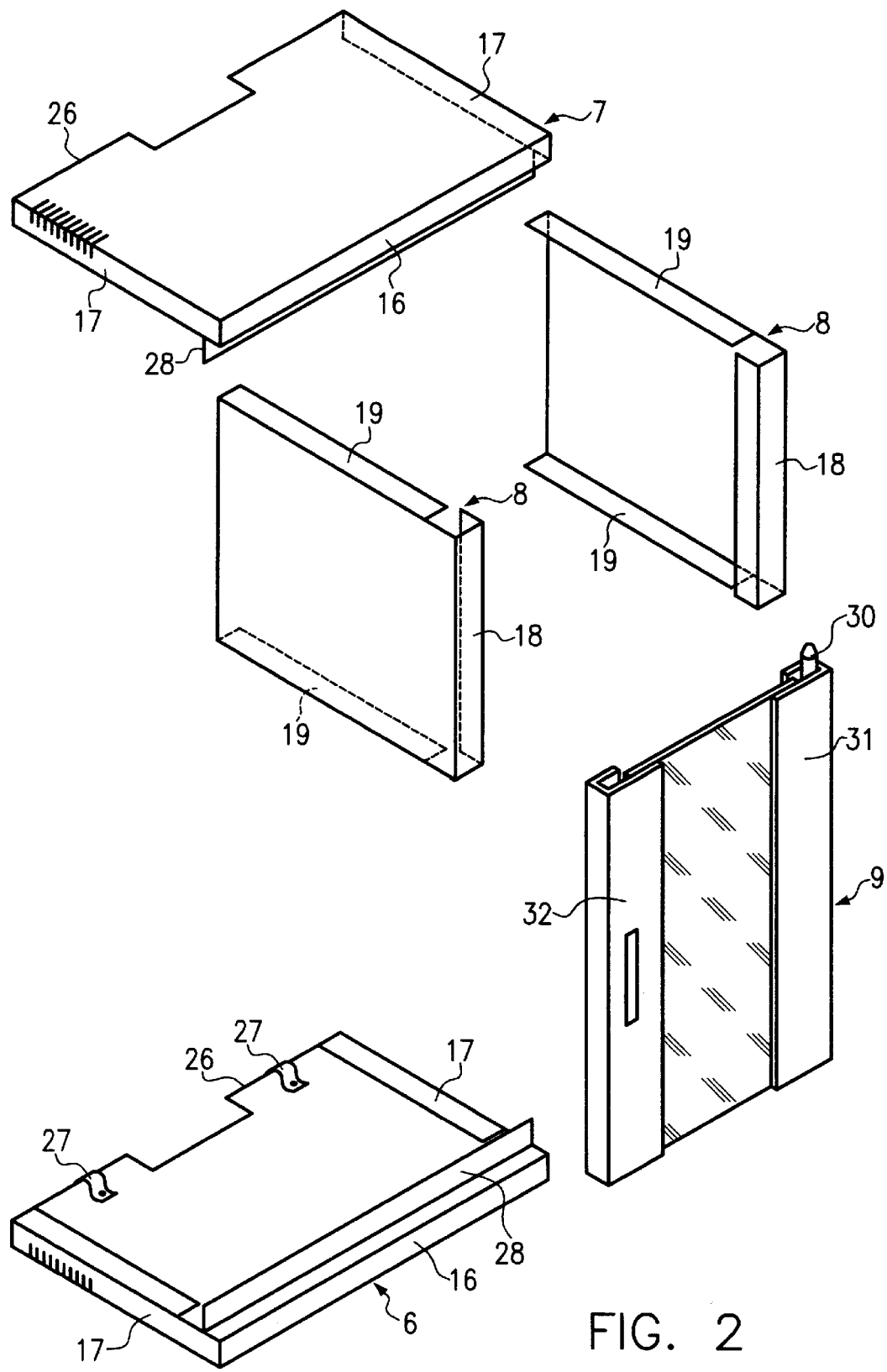
FIG. 2 shows lining parts of the cabinet system according to the invention prior to attachment to the frame according to FIG. 1.

The lining parts 6 to 9 are shown, in FIG. 2 and consist of the bottom part 6, the top part 7, two side walls 8 and a front door 9. The top and bottom parts 7, 6 are substantially identically constructed and have a rear edge area 26 with fastening elements 27, two lateral edge areas 17, which are formed in U-shaped manner by two virtually right-angled bends and a front edge area 16. The front edge area 16 is also bent in a U-shaped manner and is additionally provided with a terminal, vertical web 28. The vertical web 28 more particularly serves for a tight engagement of the door 9. The U-shaped front edge area 16 is constructed in complimentary manner to the front reception area 22 of the built-in brackets 4 and the fastening elements 27, which can be arranged in clip or clamp-like manner on the inside of the top and bottom parts 7, 6 to be retained on the bottom or top, horizontal web 15 of the rear wall member 3. Thus, the bottom and top parts 6, 7 can be slid onto the respective web 15 of the rear wall member 3. A front retention is brought about in that the bottom and top parts 6, 7 with the front edge area 16 are slid onto the reception area 22 and are at least positively held.

Following the fastening of the bottom and top parts 6, 7, the side walls 8 are positioned and fastened. The side walls 8 are provided with upper 19b and lower edge areas 19a bent at right angles and a U-shaped front edge area 18 and consequently engage on the edge area of the bottom part 6, top part 7 and door 9. A screw (not shown) fastens the side walls from the reception area and is inaccessible from the outside.

In the present embodiment, the door 9 is constructed as a glass door with metal longitudinal sections 31, 32. In the area of the longitudinal sections 31, 32 are provided a lock 33 for locking the wall cabinet, as well as two hinge pins 30, whereof only the upper pin can be seen. The hinge pins 30 projects upwards and downwards over the door 9 and are vertically adjustable and can be fixed or secured in a mounting position. In an appropriate construction, the hinge pins 30 are received in an oblong hole guide (not shown), which is preferably accessible from the inside of the door 9 and permits the sliding and locking of the hinge pin 30.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A cabinet system comprising:
   (a) a frame defined by
       (1) a rear wall member having a top portion, a bottom portion, a left portion, and a right portion,
       (2) a plurality of reception means defined in the left and right portions of said rear wall member,
       (3) a plurality of brackets, each bracket including means for temporarily mounting said bracket in one of said plurality of reception means,
       (4) means for securely fastening each of said brackets to said rear wall member,
       (5) vertical profile means fixed to said brackets forming an interior space; and
   (b) lining parts removably secured to said brackets for forming an exterior surface of said cabinet system.

2. The cabinet system of claim 1, wherein each reception means of said rear wall member comprises a reception opening and wherein each temporary mounting means of said brackets comprises a fastening element for insertion and holding within said reception opening.

3. The cabinet system of claim 2, wherein the rear wall member includes reinforcing creases and wherein said reception openings are formed in said reinforcing creases.

4. The cabinet system of claim 3, wherein said means for fastening a bracket comprises: a screw; and
   a bore for receiving said screw with said bore being provided in each reinforcing crease of the rear wall member above or below each reception opening.

5. The cabinet system of claim 1, wherein at least two vertical profile means are provided for spacing pairs of brackets located on the left and right portions of said rear wall member and constructed as U-profiles and wherein said vertical profile means are constructed so as to be fixed to said brackets for fixing components and built-in units selected from the group consisting of 19 inch, metric and ETSI components and units.

6. The cabinet system of claim 5, further comprising means for securing said vertical profile means to said brackets.

7. The cabinet system of claim 1, wherein the rear wall member is constructed as a base plate and further comprises embossings for receiving a screw fastener to secure said rear wall member to a vertical wall or the like.

8. The cabinet system of claim 7, wherein the rear wall member is provided with vertical edge areas which are constructed as contact surfaces, and define with the embossing a rear wall plane for contacting the wall.

9. The cabinet system of claim 8, wherein the rear wall member is provided with webs for engagement and retention of said lining parts and the webs are constructed as virtually right-angled bends directed towards the interior space.

10. The cabinet system of claim 9, wherein said lining parts comprise a bottom part, a top part, two side walls and a door and the lining parts having bent edge areas for a engagement with and covering of fastening areas defined on said brackets.

11. The cabinet system of claim 10, wherein said bottom part and said top part each have lateral edge areas and a front edge area, which are constructed as horizontal, inwardly directed, U-shaped profile structures.

12. The cabinet system of claim 11, wherein said brackets have a reception area for slidably receiving the bottom part and top part and wherein the front edge area of the bottom and top parts is constructed for sliding on in complimentary manner to the reception area of the brackets.

13. The cabinet system of claim 12, wherein on a rear edge area of the bottom part and top part there are provided fastening elements for sliding onto said webs of the rear wall member.

14. The cabinet system of claim 13, wherein said fastening elements are at least two hooks or clip elements which are positioned to an inside of the bottom part or the top part.

15. The cabinet system of claim 14, wherein the door is articulated by means of two pins and that the pins are vertically displaceably positioned for mounting purposes and can be secured in the mounting position, where they project downwards and upwards over the door.

16. The cabinet system of claim 15, wherein the pins are in each case guided in an oblong hole guide of the door, which is formed on the inside or on a longitudinal profile of the door.

* * * * *